United States Patent [19]

Mennicke

[11] Patent Number: 5,250,671
[45] Date of Patent: Oct. 5, 1993

[54] UNSYMMETRICAL 1:2 CHROMIUM COMPLEX DYESTUFFS

[75] Inventor: Winfried Mennicke, Leverkusen, Fed. Rep. of Germany

[73] Assignee: Bayer Aktiengesellschaft, Leverkusen, Fed. Rep. of Germany

[21] Appl. No.: 941,493

[22] Filed: Sep. 8, 1992

[30] Foreign Application Priority Data

Sep. 17, 1991 [DE] Fed. Rep. of Germany ....... 4130806

[51] Int. Cl.$^5$ ..................... C09B 45/16; C09B 45/48; D06P 1/10
[52] U.S. Cl. .................................. 534/698; 534/602; 534/696; 8/527; 8/436; 8/917; 8/924
[58] Field of Search .......................................... 534/698

[56] References Cited

U.S. PATENT DOCUMENTS

| | | | |
|---|---|---|---|
| 3,621,006 | 11/1971 | Jirou et al. | 534/698 |
| 4,083,839 | 4/1978 | Back et al. | 534/698 |
| 4,618,673 | 10/1986 | Dore | 534/698 |

FOREIGN PATENT DOCUMENTS

| | | | |
|---|---|---|---|
| 260562 | 3/1988 | European Pat. Off. | |
| 2501039 | 7/1975 | Fed. Rep. of Germany | |
| 2835493 | 2/1980 | Fed. Rep. of Germany | |
| 3631751 | 3/1988 | Fed. Rep. of Germany | 534/698 |
| 2262084 | 9/1975 | France | |
| 221188 | 4/1985 | German Democratic Rep. | 534/698 |
| 1450669 | 9/1976 | United Kingdom | |
| 1492683 | 11/1977 | United Kingdom | |
| 2027734 | 2/1980 | United Kingdom | 534/698 |

OTHER PUBLICATIONS

Mennicke, Chemical Abstracts, 109:75187u (1988).
Mennicke, Chemical Abstracts, 109:75188v (1988).

*Primary Examiner*—Mary C. Lee
*Assistant Examiner*—Fiona T. Powers
*Attorney, Agent, or Firm*—Sprung Horn Kramer & Woods

[57] ABSTRACT

The novel unsymmetrical 1:2 chromium complex dyestuffs of the formula

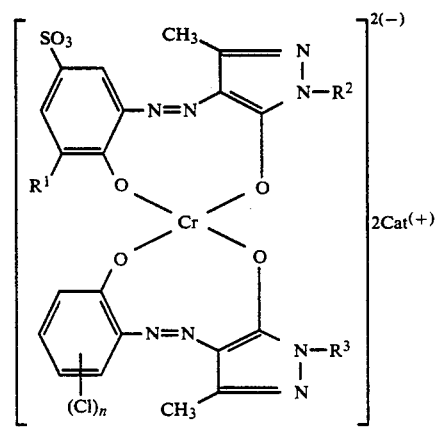

in which the substituents $R^1$, $R^2$, $R^3$, n and $Cat^{(+)}$ have the meaning given in the description, are highly suitable for the dyeing and printing of natural and synthetic amido-containing materials in predominantly red hues having good light, wet and diffusion fastness properties.

7 Claims, No Drawings

UNSYMMETRICAL 1:2 CHROMIUM COMPLEX DYESTUFFS

The present invention relates to unsymmetrical 1:2 chromium complex dyestuffs of the formula (I)

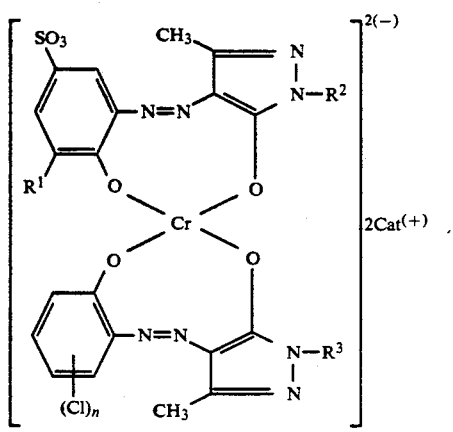

in which $R^1$ represents hydrogen, chlorine or nitro, $R^2$ and $R^3$, independently of one another, represent hydrogen or a radical of the formula

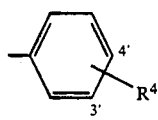

in which $R^4$ represents alkyl which is bound to the phenyl ring in the 3' or 4' position, with the proviso that one of the radicals $R^2$, $R^3$ denotes hydrogen, n represents 1 or 2 and $Cat^{(+)}$ represents a cation.

Preferred alkyl groups of the radical $R^4$ are those having 1 to 5 C atoms, which may be further substituted, preferably by CN, Cl, OH or $C_1-C_4$-alkoxy.

The cation represented by $Cat^{(+)}$ is preferably an alkali metal cation, in particular a lithium cation, sodium cation or potassium cation, an ammonium ion or the cation of an organic amine.

Particular preference is given to the dyestuffs according to the invention of the formula (II)

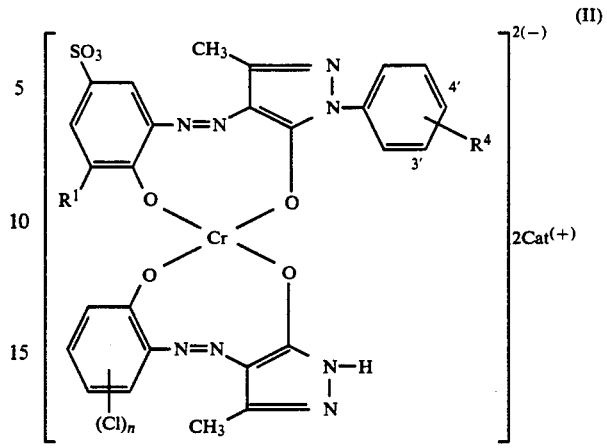

in which $R^1$, $R^4$, n and $Cat^{(+)}$ have the same meaning as in formula (I), and the radical $R^4$ is bound to the phenyl ring in the 3' or preferably 4' position The dyestuffs according to the invention of the formula (I) can be obtained in a manner known per se by converting a dyestuff of the formula (III)

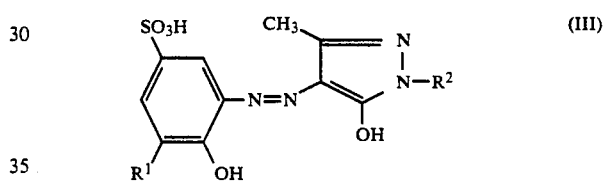

in which $R^1$ and $R^2$ have the meaning given in formula (I) or of the formula (IV)

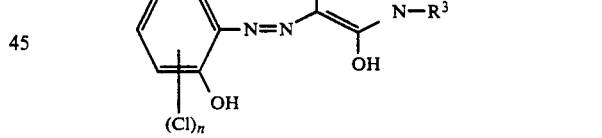

in which $R^3$ and n also have the meaning given in formula (I), into a 1:1 chromium complex using a chromium donor and reacting this complex with a non-metallised dyestuff of the formula (IV) or (III) Preferably, the reaction is carried out such that the starting material is a 1:1 chromium complex of a sulpho-containing dyestuff of the formula (III) and an adduct of this complex with a sulpho-free dyestuff of the formula (IV) is formed.

The monoazo dyestuffs of the formulae (III) and (IV) can be obtained in a known manner by coupling diazotised o-aminophenols of the formulae (V) or (VI)

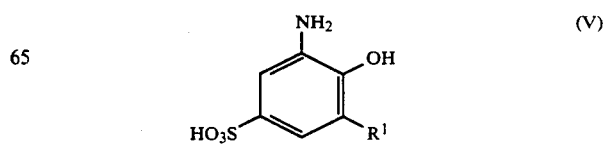

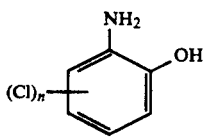

(VI)

in which

R$^1$ and n have the abovementioned meaning, onto pyrazolones of the formulae (VII) or (VIII)

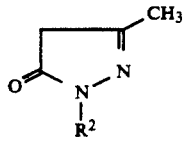

(VII)

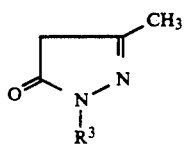

(VIII)

in which

R$^2$ and R$^3$ also have the abovementioned meaning.

Examples of suitable o-aminophenols of formulae (V) and (VI) are: 2-Aminophenol-4-sulphonic acid, 2-aminophenol-6-chloro- or -6-nitro-4-sulphonic acid, 4- or 5-chloro-2-aminophenol or 4,6-dichloro-2-aminophenol.

Preferred o-aminophenols (V) for the preparation of the 1:2 chromium complex dyestuffs according to the invention of the formula (I) are 2-amino-6-nitrophenol-4-sulphonic acid and 2-amino-6-chlorophenol-4-sulphonic acid.

Examples of suitable coupling components of formulae (VII) or (VIII) are:

3-Methyl-5-pyrazolone, 1-(3,- or -4,-methyl-, -ethyl-, -propyl-, -isopropyl-, -butyl-, -sec.-butyl-, -tert.-butyl-, -isobutyl- or -amylphenyl)-3-methyl-5pyrazolone.

The azo dyestuffs of the formula (III) or (IV) are converted into the 1:1 chromium complex by customary methods known per se by reacting, for example, the metal-free dyestuff with a salt of trivalent chromium, such as chromium fluoride, chromium chloride, chromium sulphate or chromium formate, in aqueous medium at the boiling temperature or, if appropriate, at elevated temperature.

The reaction of a 1:1 chromium complex thus prepared with a metal-free dyestuff of the formula (IV) or (III) is advantageously carried out in an alkaline to weakly acidic medium at room temperature or elevated temperature, preferably in the range from 50° to 100° C. The reactants are preferably used in stoichiometric amounts; excess chromium-containing dyestuff is in general less disadvantageous than excess chromium-free dyestuff. The acid released upon adduct formation of the metal-free dyestuff with the 1:1 chromium complex is found by addition of alkaline agents at a weakly acidic to weakly alkaline pH, for example by addition of hydroxides or carbonates of alkali metals, such as lithium hydroxide, sodium hydroxide, potassium hydroxide or lithium carbonate, sodium carbonate, potassium carbonate, ammonia or organic amines, such as mono-, di- or triethylamine, mono-, di- or triethanolamine, or of tetraalkylammonium hydroxides, such as tetramethylammonium hydroxide. Preferably, the alkaline agents are added in such a manner that the reaction proceeds at a constant pH.

The reactions described here to give the unsymmetrical 1:2 chromium complex dyestuffs according to the invention can also be carried out in the presence of organic solvents in order to speed up the reaction. Examples of suitable organic solvents are lower alcohols, such as ethanol, ketones, such as ethyl methyl ketone, carboxamides, such as formamide, dimethylformamide, N-methylpyrrolidone, glycols, such as ethylene glycol, 1,2-propylene glycol or preferably the mono-C$_1$-C$_4$-alkyl ethers, such as ethylglycol or 1-ethoxy-2-propanol.

At the end of the reaction, the dyestuffs according to the invention of the formula (I) are present as the salt of the complex acid and the SO$_3$H group bound thereto with the abovementioned alkaline agents, for example as alkali metal salts when alkali metal hydroxides or alkali metal carbonates are used or as ammonium salts when ammonia, amines or tetraalkylammonium hydroxides are used.

The 1:2 chromium complex dyestuffs thus prepared can be isolated by salting out with alkali metal salts, spray-drying or evaporation on the roll and processed using the customary auxiliaries and standardising agents to give water-soluble preparations.

Processing to give liquid preparations using organic solvents, if appropriate in a mixture with water, and, if appropriate, with the addition of solubilisers, such as, for example, urea, is also possible and is recommended in that the synthesis of the 1:2 chromium complex dyestuffs or at least the last step of their synthesis and the preparation of their solutions can be completed in one pot without isolation of the intermediates and in one step. The process of German Offenlegungsschrift 2,443,483, in which, inter alia, in adduct of the metal-free dyestuff with the 1:1 chromium complex is formed in hydroxyl-containing solvents and in the presence of alkaline lithium salts and simultaneously the stable concentrated solution of the finished 1:2 chromium complex dyestuff is obtained, is particularly advantageous. Suitable solvents for this process are in particular glycols, such as ethylene glycol, 1,2-propylene glycol, or preferably their mono-C$_1$-C$_4$-alkyl ethers, such as ethylglycol or 1-ethoxy-2-propanol.

The solid preparations which are readily soluble in water or the liquid preparations which are readily miscible with water of the 1:2 chromium complex dyestuffs according to the invention of the formula (I) which, depending on the formulation, can contain further customary additives, such as inorganic salts, dispersants, emulsifiers, antifoams, dustproofing agents, wetting agents and the like, are suitable for the dyeing and printing of a wide range of materials, in particular for the dyeing of natural and synthetic amido-containing materials, such as wool, silk, leather, polyamide or polyurethane fibres.

The preferred area of application is the dyeing of leather by various application methods. The solid preparations are suitable in particular for drum-dyeing. The dyestuffs according to the invention show good exhaustion onto leathers of different dyestuff affinity, such as chrome-tanned leather, differently retanned leathers or velour cowhide or pig leather. They form uniform dyeings and have good build-up properties with increasing availability of dyestuff without undesirable bronzing effects. Apart from drum-dyeing, the liquid preparations can also be used for dyeing on continuous dyeing machines, for the coloration of seasoning and crutching liquors and in particular for spray-dyeing with or without seasoning.

The generally red dyeings obtained are light and wet fast; the leather dyeings are moreover distinguished by good diffusion fastness.

EXAMPLES

EXAMPLE 1

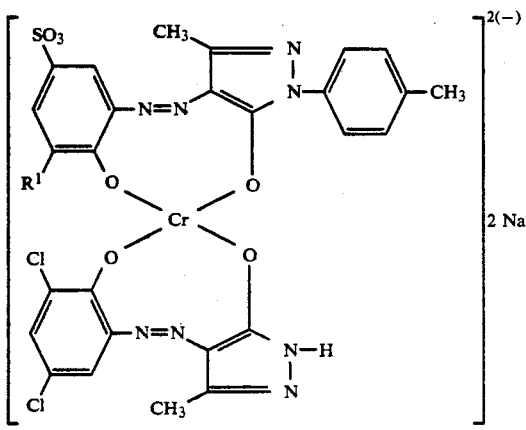

0.1 mol of 1:1 chromium complex of the dyestuff Obtained from diazotised 2-amino-6-nitrophenol-4-sulphonic acid and 1-(4'-methylphenyl)-3-methyl-5-pyrazolone is introduced into one litre of water, and 0.1 mol of monoazo dyestuff obtained from diazotised 4,6-dichloro-2-aminophenol and 3-methyl-5-pyrazolone is ladded. The mixture is thoroughly stirred and brought to a pH of 7.0 to 7.5 by dropwise addition of 5 N sodium hydroxide solution. The mixture is heated to 75° C. over a period of one hour, during which the pH is kept at 6.5 to 7.0 with 5 N sodium hydroxide solution. After reaching 70° to 75° C., the mixture is stirred at this temperature and pH 6.5 to 7.0 for another hour until both starting compounds have disappeared. An intensely dark red solution is formed which upon spray-drying changes to a dark red powder, which is readily water-soluble and dyes wool, polyamide and leather in yellowish red hues having good fastness properties.

EXAMPLE 2

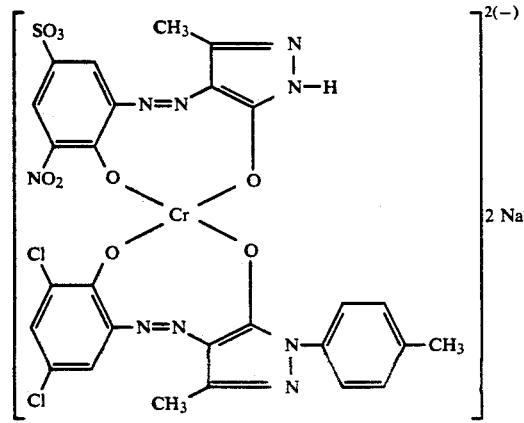

0.1 mol of the chromium complex of the dyestuff obtained from diazotised 2-amino-6-nitropnenol-4-sulphonic acid and 3-methyl-5-pyrazolone and 0.1 mol of the monoazo dyestuff obtained from diazotised 4,6-dichloro-2-aminophenol and 1-(4'-methylphenyl)-3-methyl-5-pyrazolone is reacted in one litre of water at 75° C. and pH 6.5 to 7.0 to give the unsymmetrical 1:2 chromium mixed complex. The powder obtainable by spray-drying produces yellowish red dyeings on wool, polyamide and leather, whose fastness properties are comparable to those of Example 1.

EXAMPLE 3

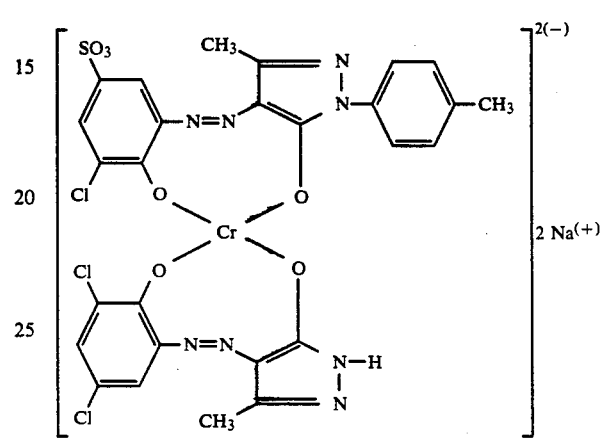

Upon adduct formation of 0.1 mol of the monoazo dyestuff obtained from diazotised 4,6-dichloro-2-aminophenol and 3-methyl-5-pyrazolone in one litre of water at 75° C. and pH 6.5 to 7.0 with 0.1 mol of the 1:1 chromium complex of the dyestuff obtained from diazotised 2-amino-6-chlorophenol-4-sulphonic acid and 1-(4'-methylphenyl)-3-methyl5-pyrazolone, an unsymmetrical 1:2 chromium mixed complex is obtained which produces bluish red dyeings on wool, polyamide and leather.

EXAMPLE 4

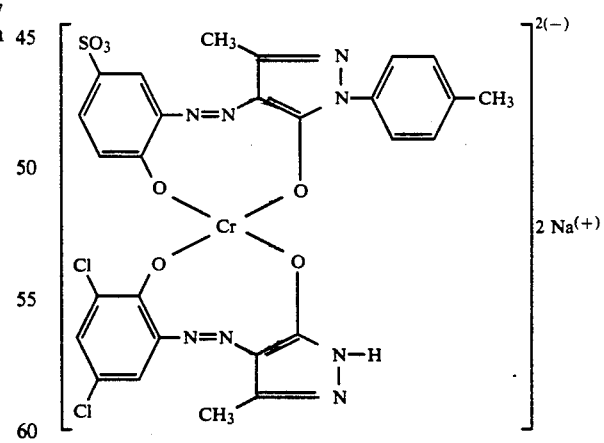

The 1:2 chromium mixed complex obtainable from 0.1 mol of the 1:1 chromium complex of the azo dyestuff obtained from diazotised 2-aminophenol-4-sulphonic acid and 1-(4'-methylphenyl)-3-methyl-5-pyrazolone and 0.1 mol of the azo dyestuff obtained from diazotised 4,6-dichloro-2-aminophenol and 3-methyl-5-pyrazolone in the presence of sodium hydroxide solution at pH 6.5 to 7.0 and 75° C. dyes wool, polyamide and leather in bright red hues. The dyeings are light fast and wet fast; the spray-dyeing on leather is distinguished by good diffusion fastness.

EXAMPLES 5 TO 27

The procedure as described in Example 1 is repeated, except that 1:1 chromium complexes of azo dyestuffs listed in Table 1 below in column 1 and stoichiometric amounts of the azo dyestuffs listed in column 2 are used as the reactants, giving valuable 1:2 chromium complex dyestuffs which dye wool, polyamide and leather in bright red to bluish red hues having good fastness properties.

TABLE 1

| Ex. No. | 1 | 2 |
|---|---|---|
| 5 | [structure: 4-SO₃H, 3-NO₂, 2-OH phenyl–N=N–C(CH₃)=C(OH)–CH=N–NH–C₆H₄–CH₃ (p)] | [structure: 4-Cl, 2-OH phenyl–N=N–C(CH₃)=C(OH)–CH=N–NH] |
| 6 | [structure: 4-SO₃H, 3-Cl, 2-OH phenyl–N=N–C(CH₃)=C(OH)–CH=N–NH–C₆H₄–CH₃ (p)] | [structure: 4-Cl, 2-OH phenyl–N=N–C(CH₃)=C(OH)–CH=N–NH] |
| 7 | [structure: 4-SO₃H, 2-OH phenyl–N=N–C(CH₃)=C(OH)–CH=N–NH–C₆H₄–CH₃ (p)] | [structure: 4-Cl, 2-OH phenyl–N=N–C(CH₃)=C(OH)–CH=N–NH] |
| 8 | [structure: 4-SO₃H, 3-NO₂, 2-OH phenyl–N=N–C(CH₃)=C(OH)–CH=N–NH–C₆H₄–CH₃ (m)] | [structure: 3,5-diCl, 2-OH phenyl–N=N–C(CH₃)=C(OH)–CH=N–NH] |
| 9 | [structure: 4-SO₃H, 3-NO₂, 2-OH phenyl–N=N–C(CH₃)=C(OH)–CH=N–NH–C₆H₄–C₂H₅ (p)] | [structure: 3,5-diCl, 2-OH phenyl–N=N–C(CH₃)=C(OH)–CH=N–NH] |
| 10 | [structure: 4-SO₃H, 3-NO₂, 2-OH phenyl–N=N–C(CH₃)=C(OH)–CH=N–NH–C₆H₄–C₂H₅ (m)] | [structure: 3,5-diCl, 2-OH phenyl–N=N–C(CH₃)=C(OH)–CH=N–NH] |
| 11 | [structure: 4-SO₃H, 3-NO₂, 2-OH phenyl–N=N–C(CH₃)=C(OH)–CH=N–NH–C₆H₄–CH₂CH₂CH₃ (p)] | [structure: 3,5-diCl, 2-OH phenyl–N=N–C(CH₃)=C(OH)–CH=N–NH] |

TABLE 1-continued

| Ex. No. | 1 | 2 |
|---|---|---|
| 12 | (structure: 4-SO₃H, 3-NO₂, 2-OH phenyl–N=N–pyrazolone(CH₃, OH)–N=N–phenyl-3-CH₂CH₂CH₃) | (structure: 2,4-dichloro-6-OH phenyl–N=N–pyrazolone(CH₃, OH, NH)) |
| 13 | (structure: 4-SO₃H, 3-NO₂, 2-OH phenyl–N=N–pyrazolone(CH₃, OH)–N=N–phenyl-4-CH(CH₃)₂) | (structure: 2,4-dichloro-6-OH phenyl–N=N–pyrazolone(CH₃, OH, NH)) |
| 14 | (structure: 4-SO₃H, 3-NO₂, 2-OH phenyl–N=N–pyrazolone(CH₃, OH)–N=N–phenyl-3-CH(CH₃)₂) | (structure: 2,4-dichloro-6-OH phenyl–N=N–pyrazolone(CH₃, OH, NH)) |
| 15 | (structure: 4-SO₃H, 3-NO₂, 2-OH phenyl–N=N–pyrazolone(CH₃, OH)–N=N–phenyl-4-CH₂CH₂CH₂CH₃) | (structure: 2,4-dichloro-6-OH phenyl–N=N–pyrazolone(CH₃, OH, NH)) |
| 16 | (structure: 4-SO₃H, 3-NO₂, 2-OH phenyl–N=N–pyrazolone(CH₃, OH)–N=N–phenyl-3-CH₂CH₂CH₂CH₃) | (structure: 2,4-dichloro-6-OH phenyl–N=N–pyrazolone(CH₃, OH, NH)) |
| 17 | (structure: 4-SO₃H, 3-NO₂, 2-OH phenyl–N=N–pyrazolone(CH₃, OH)–N=N–phenyl-4-CH(CH₃)(CH₂CH₃)) | (structure: 2,4-dichloro-6-OH phenyl–N=N–pyrazolone(CH₃, OH, NH)) |
| 18 | (structure: 4-SO₃H, 3-NO₂, 2-OH phenyl–N=N–pyrazolone(CH₃, OH)–N=N–phenyl-4-C(CH₃)₃) | (structure: 2,4-dichloro-6-OH phenyl–N=N–pyrazolone(CH₃, OH, NH)) |
| 19 | (structure: 4-SO₃H, 3-NO₂, 2-OH phenyl–N=N–pyrazolone(CH₃, OH)–N=N–phenyl-4-n-C₅H₁₁) | (structure: 2,4-dichloro-6-OH phenyl–N=N–pyrazolone(CH₃, OH, NH)) |

TABLE 1-continued

| Ex. No. | 1 | 2 |
|---|---|---|
| 20 | (chemical structure) | (chemical structure) |
| 21 | (chemical structure) | (chemical structure) |
| 22 | (chemical structure) | (chemical structure) |
| 23 | (chemical structure) | (chemical structure) |
| 24 | (chemical structure) | (chemical structure) |
| 25 | (chemical structure) | (chemical structure) |
| 26 | (chemical structure) | (chemical structure) |
| 27 | (chemical structure) | (chemical structure) |

EXAMPLE 28

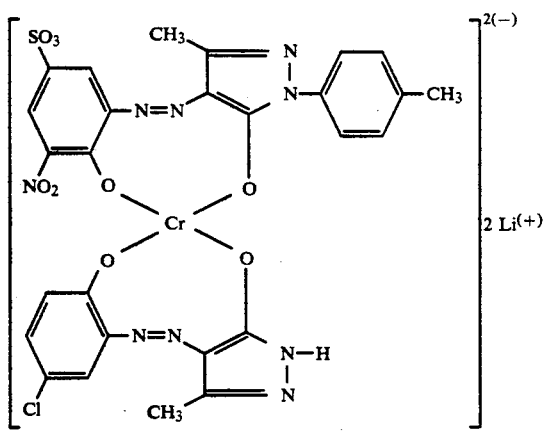

0.1 mol of the 1:1 chromium complex of the azo dyestuff obtained from diazotised 2-amino-6-nitrophenol-4-sulphonic acid and 1-(4,-methylphenyl)-3-methyl-5-pyrazolone is stirred in the form of a moist presscake in 200 g of 1-ethoxy-2-propanol, an 0.1 mol of the azo dyestuff obtained from diazotised 4-chloro-2-aminophenol and 3-methyl-5-pyrazolone is added. The mixture is heated to 75° C., and the acid released during the reaction is trapped with aqueous lithium hydroxide solution at a pH of 6.5 to 7.0. After about one hour, the reaction to give the unsymmetrical 1:2 chromium complex is complete. The hot solution of 75° C. is allowed to cool to room temperature, a small amount of salt residues is separated off by filtration and a deep red solution is obtained which produces yellowish red, non-bronzing diffusion-fast dyeings in the spray- and dip-dyeing of leather.

EXAMPLES 29 TO 41

The procedure as described in Example 28 is repeated, except that 1:1 chromium complexes of azo dyestuffs listed in Table 2 below in column 1 are used and these complexes are reacted with the azo dyestuffs listed in column 2, giving the solutions of further valuable 1:2 chromium complex dyestuffs, which dye wool, polyamide and leather in yellowish to bluish red hues having good fastness properties.

TABLE 2

| Ex. No. | 1 | 1 |
|---|---|---|
| 29 | 4-SO₃H, 3-OH, 2-NO₂-phenyl–N=N–[4-CH₃,5-OH-pyrazole]–N(3-CH₃-phenyl) | 4-Cl,2-OH-phenyl–N=N–[4-CH₃,5-OH-pyrazole]–NH |
| 30 | 4-SO₃H, 3-OH, 2-NO₂-phenyl–N=N–[4-CH₃,5-OH-pyrazole]–N(4-C₂H₅-phenyl) | 4-Cl,2-OH-phenyl–N=N–[4-CH₃,5-OH-pyrazole]–NH |
| 31 | 4-SO₃H, 3-OH, 2-NO₂-phenyl–N=N–[4-CH₃,5-OH-pyrazole]–N(3-C₂H₅-phenyl) | 4-Cl,2-OH-phenyl–N=N–[4-CH₃,5-OH-pyrazole]–NH |
| 32 | 4-SO₃H, 3-OH, 2-NO₂-phenyl–N=N–[4-CH₃,5-OH-pyrazole]–N(4-CH₂CH₂CH₃-phenyl) | 4-Cl,2-OH-phenyl–N=N–[4-CH₃,5-OH-pyrazole]–NH |
| 33 | 4-SO₃H, 3-OH, 2-NO₂-phenyl–N=N–[4-CH₃,5-OH-pyrazole]–N(4-CH(CH₃)₂-phenyl) | 4-Cl,2-OH-phenyl–N=N–[4-CH₃,5-OH-pyrazole]–NH |

TABLE 2-continued

| Ex. No. | 1 | 1 |
|---|---|---|
| 34 | [structure: 2,4-disubstituted phenyl (SO₃H, NO₂, OH) —N=N— pyrazolone (CH₃, OH) —N=N— C₆H₄—CH₂CH₂CH₂CH₃] | [structure: chlorophenol —N=N— pyrazolone (CH₃, OH) —N—NH] |
| 35 | [structure: SO₃H, NO₂, OH phenyl —N=N— pyrazolone —N=N— C₆H₄—C(CH₃)₃] | [same right-side structure] |
| 36 | [structure: SO₃H, Cl, OH phenyl —N=N— pyrazolone —N=N— C₆H₄—CH₃ (para)] | [same] |
| 37 | [structure: SO₃H, Cl, OH phenyl —N=N— pyrazolone —N=N— C₆H₄—CH₃ (meta)] | [same] |
| 38 | [structure: SO₃H, Cl, OH phenyl —N=N— pyrazolone —N=N— C₆H₄—C₂H₅] | [same] |
| 39 | [structure: SO₃H, Cl, OH phenyl —N=N— pyrazolone —N=N— C₆H₄—CH(CH₃)₂] | [same] |
| 40 | [structure: SO₃H, Cl, OH phenyl —N=N— pyrazolone —N=N— C₆H₄—CH₂CH₂CH₂CH₃] | [same] |
| 41 | [structure: SO₃H, Cl, OH phenyl —N=N— pyrazolone —N=N— C₆H₄—C(CH₃)₃] | [same] |

I claim:

1. An unsymmetrical 1:2 chromium complex dyestuff of the formula

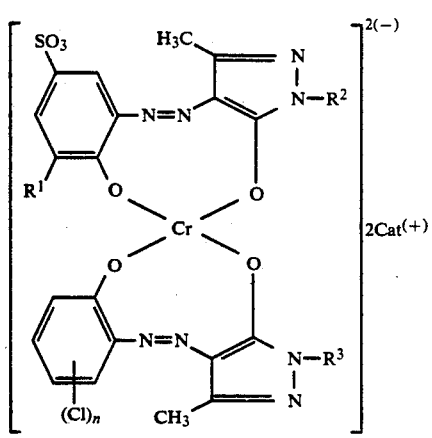
(I)

in which $R^1$ represents hydrogen, chlorine or nitro, $R^2$ and $R^3$, independently of one another, represent hydrogen or a radical of the formula

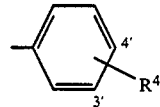

in which $R^4$ represents alkyl which is bound to the phenyl ring in the 3' or 4' position, with the proviso that one of the radicals $R^2$, $R^3$ denotes hydrogen, n represents 1 or 2 and $Cat^{(+)}$ represents a cation.

2. A dyestuff of claim 1 of the formula

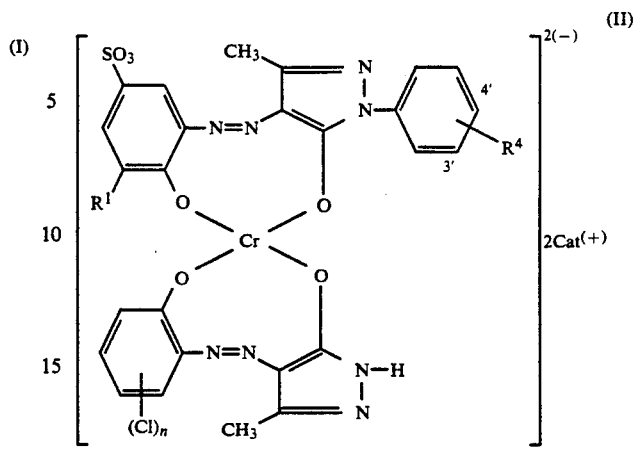
(II)

in which
$R^1$, $R^4$, n and $Cat^{(+)}$ have the meaning given in claim 1,
and the radical $R^4$ is bound to the phenyl ring in the 3' or 4' position 3. A dyestuff of claim 1, in which the radical $R^4$ is bound to the phenyl ring in the 4' position.

4. A dyestuff of claim 1, in which $R^1$ represents chlorine or nitro.

5. A dyestuff of the formula

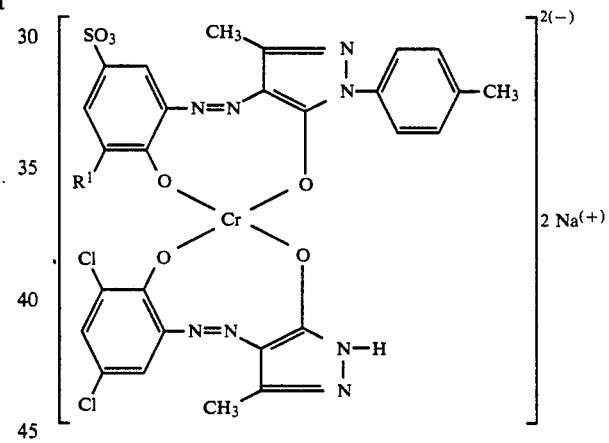

6. A dyestuff of the formula

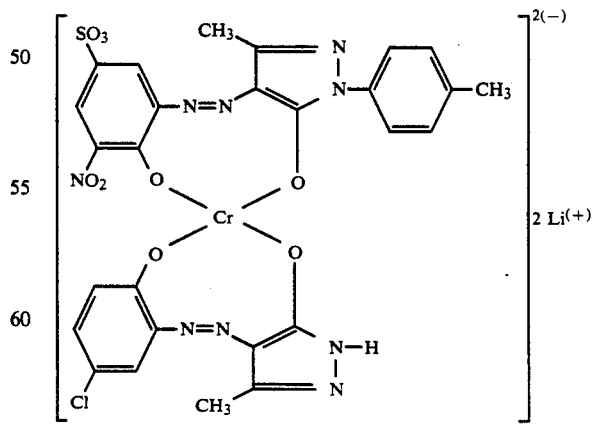

7. A process for the dyeing or printing of natural or synthetic amido-containing materials, by applying thereto a dyestuff of claim 1.

* * * * *

UNITED STATES PATENT AND TRADEMARK OFFICE
CERTIFICATE OF CORRECTION

PATENT NO. : 5,250,671
DATED : October 5, 1993
INVENTOR(S) : Winfried Mennicke

It is certified that error appears in the above-indentified patent and that said Letters Patent is hereby corrected as shown below:

Col. 18, line 35   Delete "

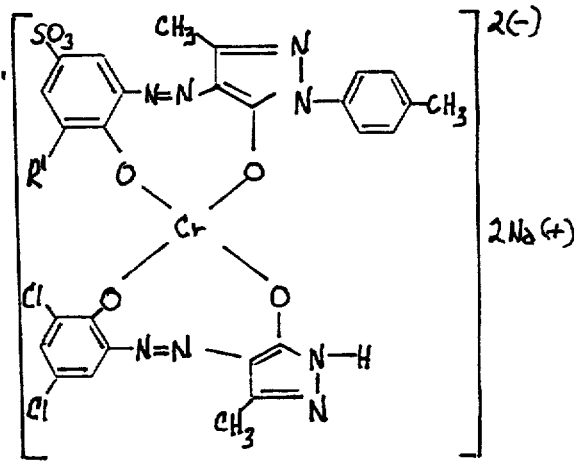

"

and substitute

UNITED STATES PATENT AND TRADEMARK OFFICE
CERTIFICATE OF CORRECTION

PATENT NO.  : 5,250,671
DATED       : October 5, 1993
INVENTOR(S) : Winfried Mennicke It is certified that error appears in the above-indentified patent and that said Letters Patent is hereby corrected as shown below:

Col. 18, line 35
Cont'd

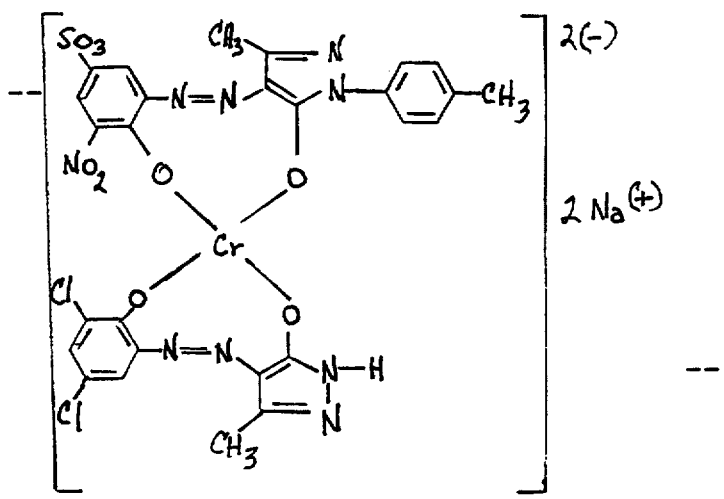

--

Signed and Sealed this

Twenty-eight Day of February, 1995

Attest:

BRUCE LEHMAN

Attesting Officer         Commissioner of Patents and Trademarks